United States Patent Office 3,285,865
Patented Nov. 15, 1966

3,285,865
EXPANDABLE POLYMERS
Sam J. Del Bene, Ambridge, and Alan J. Fox, Sewickley, Pa., assignors to Koppers Company, Inc., a corporation of Delaware
No Drawing. Filed July 11, 1963, Ser. No. 294,244
4 Claims. (Cl. 260—2.5)

This invention relates generally to expandable cellular polymeric materials and more particularly to expandable polystyrene foams having improved surface appearance, solvent resistance, and water vapor transmission resistance.

The advent of expandable polymeric foams and particularly expandable polystyrene foams has been a valuable addition to the art of container and packaging manufacture because expanded polystyrene foams are greatly superior in impact resistant and thermal insulation qualities to other container and packaging materials. Consequently, expanded foams prepared from expandable polystyrene offer unique advantages in the manufacture of lightweight, thermally insulated beverage containers and impact resistant packages.

Expandable polystyrene is commercially available as polymeric particles in bead or pellet form which contain a blowing agent such as a hydrocarbon dispersed within the particles. These particles which contain hydrocarbon blowing or expanding agents can be processed by extrusion, blow molding, injection molding, and the like to produce a shaped foam container or package. Under the influence of heat using any of the above-described techniques, the blowing agent causes the polymer to expand and fuse together forming the final foam product. The final product, characteristically, is in the nature of small discrete cells fused or bonded together.

To date, these products manufactured from expandable polystyrene exhibit a surface skin which tends to show the line of junction of the discrete particles and most liquids used in the containers will stain the surface of the foamed product so as to outline these boundary lines or cells. While the skin of the expandable polystyrene products is generally tough it is extremely susceptible to abrasion and the surface itself has a dull non-aesthetic appearance. Another disadvantage of containers or products made from expandable polystyrene foams is that they have poor water vapor transmission characteristics. The problem created by this disadvantage is serious inasmuch as the thermally insulating expandable polystyrene containers are designed primarily for use as ice buckets, cups, trays, and the like to contain heated or cooled beverages.

Staining of the foam containers by whatever beverage may be contained therein does not permit more than a single use for each container. Additionally, the containers can not retain beverages for a great length of time due to the rapid water vapor transmission characteristics. The containers are also limited to the type of liquid which may be used therein. For example, materials which indicate even a slight solvent action on polystyrene can not be packaged and shipped in containers made of expandable polystyrene because the polystyrene material will not resist sufficiently this solvent action and the liquids would have a tendency to leak from these containers.

Expandable polystyrene has found wide use in packaging of fragile instruments such as typewriters, glass, and the like. However, there are also many delicate instruments which are shipped in containers and must be kept relatively free from moisture. Because of the water vapor transmission characteristics of expandable polystyrene foam they can not advantageously be used to ship instruments which must be kept within relatively dry atmospheres. Consequently, the full value of the expandable polystyrene foams can not be realized.

We have found, most unexpectedly, that if powdered polyethylene is incorporated into expandable polystyrene that the foam materials produced therefrom possess a vastly improved surface appearance, a vastly improved solvent resistance and a heretofore unknown resistance to the transmission of water vapor.

It is a primary object of this invention to produce expandable polystyrene foams of improved solvent resistance, improved water vapor transmission characteristics, and of a continuous fused outer surface. Other objects and advantages will be apparent from the following description.

The expandable polystyrene materials employed in this invention may be prepared by any of the conventional methods known in the art. For example, expandable polymeric beads have been produced by the suspension polymerization method. In this method the suspended beads are subjected to the atmosphere of a selected blowing agent and the beads are impregnated. Alternatively, the suspension polymerization may be conducted in the presence of the blowing agent so that the polymer beads contain upon conclusion of polymerization a stated percentage of the blowing agent. A preferred expandable polymeric particle useful in this invention is described in U.S. Patent No. 3,089,857, Carl H. Pottenger, assigned to the assignee of this invention. This method is known as the quench pellet method. In this method, a normally liquid blowing agent is homogeneously and uniformly admixed with the polystyrene resin that is in a plastic state under conditions such that foaming of the resin does not occur, extruding the admixture through a die of the desired shape and quenching the admixture before foaming can occur. Accordingly, the admixture after quenching is pelletized to render it suitable for fabrication in a molding process or for extruding processes such as are useful in the method of this invention.

Compositions in accordance with the present invention are comprised of polystyrene in discrete granular (pellet) form in which there is incorporated an expanding agent and with which there is distributed in approximately uniform quantity, a powdered polyethylene material. These compositions may thus be formed into a foam structure having a smooth continuous surface appearance, a resistance to the action of solvents and a resistance to permeation of the foam structure by moisture. Accordingly these compositions can be charged into a closed mold, and subjected to heat of sufficient temperature to soften the composition material and cause expansion of the blowing agent to therefore expand the mass of pellets into an integral molded foam structure. Additionally, the composition in the form of pellets may be blow-molded into shapes such as bottles using conventional blow-molding equipment.

The results achieved by this invention are amazing in view of the fact that polyethylene and polystyrene are incompatible materials, that is, the materials are known to be, to a great extent, insoluble in each other. Thus, polyethylene and polystyrene not being mutually soluble, a composition exhibiting properties such as those of this invention is totally unexpected.

Articles produced in accordance with this invention are comprised of foam structures of expanded polystyrene material containing a high-density polyethylene substantially and homogeneously dispersed throughout which materials have a smooth uniform surface and which materials possess water and solvent-resistant characteristics which have been heretofore unknown and unobtainable when produced from regular expandable polystyrene particles or pellets.

Polyethylene material of varying powder sizes may advantageously by employed in the practice of this invention. For example, a mixture of high density polyethylene powder of the following screen analysis may be advantageously used to produce the novel composition of this invention.

*Screen analysis of polyethylene powder*

[High density polyethylene powder—
melt index=13.6 gm./10 min.]

| Through-on: | Percent |
|---|---|
| −40 mesh | 2.4 |
| 40 mesh–80 mesh | 2.8 |
| 80 mesh–100 mesh | 2.2 |
| 100 mesh–140 mesh | 7.6 |
| 140 mesh–200 mesh | 11.5 |
| 200 mesh–325 mesh | 56.2 |
| 325 mesh | 17.3 |

It should be understood that this particular combination of polyethylene powder of this melt index is not the only combination operable in this invention.

Preferably, the polyethylene powder material is incorporated within the expandable polystyrene particles during the formation or preparation of the expandable materials. By way of example, the polystyrene, polyethylene powder and expanding agent may be combined in the feed hopper of an extruder in sufficient quantity so that at the desired feed rate the feed worms will be full. The polystyrene may contain some of the blowing agent, all of the blowing agent, or none of the blowing agent to be contained in the final composition. A pressure generated by the feed worms forces the particles into the extruder mixing zone where, in those instances where the polymer contains none or only a small proportion of the expanding agent, additional expanding agent may be forced into the plasticized mass by means of constant delivery pressure pump. The action of the screw forcing the plastic through the barrel of the extruder causes the blowing agent to become intimately and homogeneously admixed with the plastic mass. The blowing agent may also be injected into the plastic mass through the screw rather than or in addition to, injection through the barrel.

The extruder used in accordance with this invention is generally of conventional design. Suitable extruders are described in chapter 4 of "Processing of Thermoplastic Materials" edited by E. C. Barnhardt, 1959. Depending upon screw design, provision may be made to prevent feedback of the blowing agent into the feed zone of the hopper. For example, if the blowing agent is a hydrocarbon, it may tend to flow back toward the hopper and condense out on the beads causing them to cake and thus prevent continuous operation. This tendency can be avoided by proper screw design and addition of the blowing agent to the extruded mass at the proper place.

The extruder is operated at temperatures so that the rendering of the polymer to the plastic state takes place rapidly inhibiting the escape of the blowing agent. Typical extrusion temperatures for the practice of this invention include:

| | °F. |
|---|---|
| Rear cylinder temperatures | 240–250 |
| Front cylinder temperatures | 255—270 |
| Die temperatures | 270—290 |

The plastic mass containing the blowing agent is forced through the die of desired shape such as a strand die. The polymer leaving the extruder die is quenched before foaming can occur. By quenching is meant cooling the extrudant at a rapid rate, e.g., as quickly as possible, from the extrusion temperature to a temperature lower than the softening temperature of the polymer. The quenching of the extrudate should immediately follow the extrusion, preferably without permitting the extrudate to be exposed to the atmosphere for any substantial length of time. This can usually be accomplished by extruding directly into a cooling bath, e.g., water or by using a specially constructed die wherein the exit end of the die is insulated from the heated portion of the die and is cooled such as by circulating a liquid or gas refrigerant through said die.

The quantity of polyethylene material which may be employed in the total composition depends upon a variety of factors and conditions. For example, the quantity of polymeric particles being expanded to produce a foamed object and the desired characteristics of the end products formed will dictate the ultimate quantities. Ordinarily, it is preferred to use enough of the polyethylene powder to insure improvements in vapor transmission characteristics, solvent resistance and surface appearance. In this respect at least about one per cent by weight of the powdered polyethylene is desirable in the composition of this invention. In any case the polystyrene contained in the composition should always exceed, in quantity, the powdered polyethylene.

The use of normally liquid expanding agents in amounts of up to 15 parts per 100 parts of polymeric particles, that is, polystyrene, plus polyethylene, plus expanding agent, yield useable expandable polymeric particles. Particularly good results are obtained in the range of about seven parts of blowing agent but greater or lesser amounts may be used depending upon the use to which the resulting particles will be put.

Among the blowing agents useful in accordance with this invention are the normally liquid aliphatic hydrocarbons boiling in the range of approximately 20–100° C. and mixtures thereof with volatile solvents in such amounts that the resulting mixture is not a solvent for the polymer. Aliphatic hydrocarbons boiling below the incipient softening point of the polymer with which they are to be used are useful in the process of this invention. Excellent results are obtained with blowing agents boiling in the range 25–65° C.

The method of the present invention is further illustrated by the following examples.

EXAMPLE I

Expandable polystyrene beads (sold under the trademark Dylite), containing 7.75 percent by weight of normal pentane, in an amount of 95 parts was charged to the hopper of a National Rubber Machine Company 1.5 inch extruder having a length to diameter ratio of 20:1 while simultaneously five parts of a powdered polyethylene of the following screen analysis was charged.

| Through-on: | Percent |
|---|---|
| −40 mesh | 2.4 |
| 40 mesh–80 mesh | 2.8 |
| 80 mesh–100 mesh | 2.2 |
| 100 mesh–140 mesh | 7.6 |
| 140 mesh–200 mesh | 11.5 |
| 200 mesh–325 mesh | 56.2 |
| 325 mesh | 17.3 |

The extruder was started and run using the following conditions:

| | |
|---|---|
| Screw speed, r.p.m. | 50 |
| Rear cylinder temperature, ° F. | 245 |
| Front cylinder temperature, ° F. | 265 |
| Die temperature, ° F. | 280 |

The die which contains nine, one-sixteenth inch diameter ports was immersed in a water bath which was held at 54° F. The extruded strands traveled for 20 inches under the water at a rate of 25 linear feet per minute. The strands were withdrawn from the water bath and passed into a strand pelletizer by powdered rollers. The strands of the extrudate were chopped into pellets of about three-sixteenth inch length and thereafter stored in containers at ambient room conditions.

A portion of these pellets were then mixed with a multicomponent blowing agent adjunct comprised of 0.30 percent citric acid monohydrate and 0.02 percent sodium bicarbonate until said pellets were externally coated with said adjunct. The adjunct is particularly advantageous for use with pellets that are to be processed in an extruding operation to obtain lower density foams, e.g., 2.5–5 pounds per cubic foot. The practice of adding such a multi-component adjunct is described in detail in U.S. Patent No. 2,941,964, John C. Houston and John J. Tress, assigned to the assignee of this invention. These pellets containing the externally added adjunct were extrusion blow molded in conventional extrusion blow molding equipment to produce expanded polystyrene-polyethylene composition materials in the shape of gallon bottles.

A separate portion of the quenched pellets produced in Example I was placed into a closed mold and subjected to the action of steam and molded into the form of a board.

Visual inspection of the extruded and steam molded materials indicated that they had a smooth uniform surface noticeably absent any visual line of junction between the discrete particles. Additionally, moisture vapor permeability data and solvent resistant data were gathered on the products thus produced. The procedure of this example was repeated for several runs except that the amount of powdered polyethylene used in the composition was varied. Results of the tests performed on all the materials are reproduced in Table I.

TABLE I.—PHYSICAL PROPERTY EVALUATION OF BLOW MOLDED BOTTLES AND STEAM MOLDED BLOCKS

| Run No. | Material | Composition of Quenched Pellet, Percent | | Extrusion Stock Temperature, °F. | Steam Molding Pressure (Pounds) | Water Vapor Transmission in Perms on Thickness as Shown (Transmission Estimated From 72-Hour Evaluation) | | Solvent Resistance Estimate Disintegration Time in Benzene [2] |
|---|---|---|---|---|---|---|---|---|
| | | Expandable Polystyrene | Polyethylene Powder | | | Perms | Thickness | |
| 1 | Quenched Pellet [1] | 99 | 1 | 220 | | 1.4 | 115 mils | 2 minutes. |
| 2 | do.[1] | 100 | 0 | 220 | | 2.0 | 115 mils | 4 seconds. |
| 3 | do.[1] | 97 | 3 | 220 | | 0.8 | 110 mils | 4 minutes. |
| 4 | do.[1] | 95 | 5 | 220 | | 0.4 | 115 mils | 55 minutes. |
| 5 | do.[1] | 90 | 10 | 220 | | 0.4 | 114 mils | Greater than 4 hours. |
| 6 | Quenched Pellet | 100 | | | 12–15 | 2.1 | 1 inch | 4 minutes (0.7 ml.). |
| 7 | do | 90 | 10 | | 12–15 | 0.38 | 1 inch | 41 minutes (12.8 ml.). |
| 8 | do | 95 | 5 | | 12–15 | 0.4 | 1 inch | 39 minutes. |
| 9 | do | 97 | 3 | | 12–15 | 0.7 | 1 inch | 29 minutes. |

[1] 0.30 percent citric acid monohydrate and 0.02 percent sodium bicarbonate were added externally to pellets before they were extrusion blow molded.
[2] Benzene was added dropwise at a constant rate onto the specimen until the liquid was observed on the underside of this specimen. The permeation time, an arbitrary measure of solvent resistance, represents the elapsed time from the first addition (drop) until benzene was seen on the underside of the testing area.

By way of comparison when the foregoing procedure was repeated exactly, with the exception that the polyethylene powder was not incorporated in the materials and extrusion blow molded and steam molded structures were prepared, clearly defined juncture lines appeared on the surfaces. In addition the solvent resistance and moisture vapor transmission resistance were inferior to the extrusion and steam molded foam structures obtained with the use of the combined polystyrene-polyethylene material. These results are also reproduced in Table I as run numbers 2 and 6.

As is readily apparent the present invention permits superior foam molded articles to be manufactured having greater efficiencies with respect to surface appearance, vapor transmission and solvent resistance. These benefits are obtained from the improved composition of expandable material prepared in accordance with this invention.

We claim:
1. An expandable thermoplastic composition capable of being molded into foam structures having smooth, uniform surfaces, a water vapor transmission not greater than 1.4 perms, and a solvent resistance time of at least 2 minutes for a foam thickness of 115 mils, comprising polystyrene particles in combination with a minor amount of from 3 to 10 percent by weight of said composition of powdered polyethylene, said polystyrene particles having homogeneously incorporated therein a normally liquid aliphatic hydrocarbon blowing agent, boiling in the range of from about 20–100° C.
2. The composition of claim 1 in which said thermoplastic composition is an extruded pellet.
3. The composition of claim 1 wherein the powdered polyethylene is substantially distributed with the expandable polystyrene particles by being incorporated within extruded pelletized particles.
4. A thermoplastic foam structure having smooth uniform surfaces, a water vapor transmission not greater than 1.4 perms and a solvent resistance time of at least 2 minutes for a foam thickness of 115 mils comprising expanded polystyrene having substantially distributed therein a minor amount of from 3 to 10 percent by weight of said structure of powdered polyethylene.

References Cited by the Examiner

UNITED STATES PATENTS

| | | | |
|---|---|---|---|
| 2,744,291 | 5/1956 | Stastny et al. | 260—2.5 |
| 2,787,809 | 4/1957 | Stastny | 260—2.5 |
| 2,945,828 | 7/1960 | Henning | 260—2.5 |
| 3,065,190 | 11/1962 | Chrisholm | 260—2.5 |
| 3,137,745 | 6/1964 | Johnstone | 260—2.5 |
| 3,175,985 | 3/1965 | Lightner et al. | 260—2.5 |
| 3,224,984 | 12/1965 | Roper et al. | 260—2.5 |

MURRAY TILLMAN, *Primary Examiner.*

M. FOELAK, *Assistant Examiner.*